United States Patent [19]
MacLennan et al.

[11] Patent Number: 5,235,901
[45] Date of Patent: Aug. 17, 1993

[54] METHOD AND APPARATUS FOR MAKING A FERMENTED BEVERAGE

[75] Inventors: Ian M. MacLennan, 5421 180th Street, Surrey, British Columbia, Canada, V3s 4K5; Clifford B. Hewson, West Vancouver, Canada; Marek Gnatowski, Coquitlam, Canada; Andrew Koutsandreas, Vancouver, Canada

[73] Assignee: Ian M. MacLennan, Surrey, Canada

[21] Appl. No.: 685,067

[22] Filed: Apr. 12, 1991

Related U.S. Application Data

[63] Continuation-in-part of Ser. No. 442,305, Nov. 27, 1989, abandoned.

[51] Int. Cl.$^5$ .............................................. C12C 13/00
[52] U.S. Cl. ...................................... 99/276; 99/323.1; 137/170.1; 137/578; 261/DIG. 7
[58] Field of Search .................. 99/275, 276, 323.1, 99/323.2; 55/87, 178; 137/170.1, 170.3, 170.4, 578; 220/89.1, 203, 367, 373; 261/DIG. 7

[56] References Cited

U.S. PATENT DOCUMENTS

| | | |
|---|---|---|
| 275,134 | 4/1883 | Burton .............................. 137/578 |
| 512,951 | 1/1894 | Farmer ........................... 137/170.3 |
| 546,115 | 9/1895 | Friedrich ........................ 137/170.1 |
| 558,131 | 4/1896 | Warren ............................. 137/578 |
| 808,131 | 12/1905 | Wiesenfeld ...................... 137/170.4 |
| 936,328 | 10/1909 | Kuhn .................................. 99/275 |
| 1,033,136 | 7/1912 | Wennersten ...................... 220/203 |
| 1,041,298 | 10/1912 | Kiefer ................................ 99/275 |
| 1,302,549 | 5/1919 | Heuser ............................... 99/275 |
| 1,389,101 | 8/1921 | Ohrvall .............................. 55/178 |
| 1,831,585 | 11/1931 | Zerweck ............................ 99/276 |
| 1,917,582 | 7/1933 | Gordon .......................... 137/170.3 |
| 2,031,397 | 2/1936 | Voight ............................... 55/178 |
| 2,136,685 | 11/1938 | Gull .................................... 99/275 |
| 2,239,315 | 3/1941 | Orr ..................................... 55/178 |
| 2,521,397 | 9/1950 | Muller ................................ 99/275 |
| 2,593,770 | 4/1952 | Kollsman ........................ 99/323.1 |
| 3,374,726 | 3/1968 | Takayanagi ........................ 99/275 |
| 3,528,817 | 9/1970 | Barrett et al. . |

(List continued on next page.)

FOREIGN PATENT DOCUMENTS

| | | | |
|---|---|---|---|
| 17548 | 5/1934 | Australia .............................. 99/275 |
| 464862 | 5/1950 | Canada ................................ 99/275 |
| 29624 | 6/1981 | European Pat. Off. ............. 99/276 |
| 409968 | 2/1910 | France ................................ 220/203 |
| 554797 | 6/1923 | France ................................ 55/178 |
| 848091 | 10/1939 | France ................................ 220/203 |
| 1070239 | 7/1954 | France ................................ 220/203 |
| 66887 | 6/1977 | Japan .................................. 55/178 |
| 595868 | 2/1978 | Switzerland ....................... 55/178 |
| 1346187 | 10/1987 | U.S.S.R. ............................. 55/178 |
| 27551 | 12/1903 | United Kingdom . |
| 28877 | 12/1912 | United Kingdom .................. 99/276 |
| 217714 | 6/1924 | United Kingdom ................ 137/578 |
| 922200 | 3/1963 | United Kingdom ............... 220/4.24 |
| 2123850 | 2/1984 | United Kingdom .................. 99/276 |
| 2165768 | 4/1986 | United Kingdom .................. 55/178 |

*Primary Examiner*—Harvey C. Hornsby
*Assistant Examiner*—Mark Spisich
*Attorney, Agent, or Firm*—Neil F. Markva

[57] ABSTRACT

The assembly of the invention includes a pressure vessel having a size to fit in a usual home refrigerator for the domestic fermenting of a fermentable liquid mixture under pressure and under chilled conditions. The pressure vessel defines a closed fermentation chamber for containing a bath having an amount of fermentable liquid mixture effective to provide a pressurized atmosphere above the surface of the bath wi thin the closed fermentation chamber during the fermenting process. A pressure relief valve controls the pressure within the fermentation chamber at a level sufficient to maintain safety conditions during the fermentation process. Pressurized gaseous material is introduced into the pressure vessel upon completion of the fermentation process to maintain pressure in the bath within the chamber. A spigot which is part of an output discharge mechanism including a float used to remove fermented beverage from adjacent the surface of the bath to draw beverage from the pressurized vessel while a pressurized atmosphere remains in the vessel.

12 Claims, 8 Drawing Sheets

U.S. PATENT DOCUMENTS

| | | | |
|---|---|---|---|
| 3,679,600 | 7/1972 | Hahm | 55/178 |
| 3,760,711 | 9/1973 | Webster | 99/277.1 |
| 3,946,780 | 3/1976 | Sellers . | |
| 4,218,964 | 8/1980 | Beadle | 99/275 |
| 4,222,972 | 9/1980 | Caldwell . | |
| 4,267,940 | 5/1981 | Wade | 220/321 |
| 4,329,918 | 5/1982 | Kühtreiber | 99/276 |
| 4,343,824 | 8/1982 | Caldwell . | |
| 4,373,024 | 2/1983 | Hunt | 55/87 |
| 4,399,744 | 8/1983 | Ogden | 99/323.1 |
| 4,423,670 | 1/1984 | Tenison | 99/275 |
| 4,754,698 | 7/1988 | Naish | 99/275 |

METHOD AND APPARATUS FOR MAKING A FERMENTED BEVERAGE

CROSS REFERENCE TO RELATED APPLICATION

This application is a continuation-in-part of U.S. patent application Ser. No. 07/442,305 filed Nov. 27, 1989, abandoned.

FIELD OF THE INVENTION

This invention relates to a method and apparatus for making a fermented beverage, such as beer. More particularly, the invention relates to making a fermented beverage in a pressurized or closed environment for the homebrewing trade.

BACKGROUND OF THE INVENTION

Beer has been made for many years by various well known techniques and by using various apparatuses for many years, as is well known. In general, these techniques can be divided into commercial and homemaking methods. Commercial techniques produce consistent quality effervescent beer of various types but the price of such effervescent beer is high due to taxes and the like which are placed on the beer.

Homemaking beer is far less expensive than buying commercially available beer and has become increasingly popular as the price of commercially available beer continues to rise. Various techniques have been used to produce homemade beer but there are disadvantages with many.

In general, homemade beer is made in an "open" system. That is, homemade beer is generally made under ambient or atmospheric conditions where the beer is exposed to the atmosphere. Making beer under these conditions allows oxygen to be absorbed into the beer. This can adversely affect shelf-life expectancy and flavor degradation. In addition, cleanliness is very important in making homemade beer and with the variety of containers, hoses and the like which inherently must be used in the process, the cleanliness requirement is troublesome. Yet a further disadvantage is that beer produced by homemade techniques is inconsistent in quality between batches. Because of these disadvantages, the homemade beer industry is not growing as robustly as might otherwise be the case.

SUMMARY OF THE INVENTION

The invention is directed to an assembly for fermenting a fermentable liquid mixture for making a fermented beverage under chilled pressure conditions. The assembly comprises a pressure vessel defining a closed fermentation chamber for containing a bath including an amount of fermentable liquid mixture sufficient to provide an upper surface on the bath within the closed chamber. The pressure vessel has a structural configuration effective to fit in to a usual home refrigerator for cooling the liquid mixture bath.

The pressure vessel includes ingredient inlet means for adding a cold fermenting yeast to the bath of fermentable liquid mixture. Pressure relief valve means controls the pressure within the fermentation chamber at a level sufficient to maintain safety conditions during fermentation process. Gas input valve mean introduces pressurized gaseous material into the pressure vessel. Output discharge means is for removing fermented beverage from adjacent the surface of the bath and for drawing the fermented beverage from the pressure vessel while a pressurized atmosphere remains in the vessel.

Another feature of the invention includes ingredient inlet means located on the pressure vessel above the surface of the fermentable liquid bath. The pressure relief valve means is located on the pressure vessel to release gas from the pressurized atmosphere. In a specific embodiment, the ingredient inlet means includes an ingredient inlet opening in the pressure vessel above the surface of the bath. Ingredient inlet cap means coves the ingredient inlet opening after fermentation ingredients are introduced into the chamber. The ingredient inlet cap means includes the pressure release valve means for maintaining a selected pressure in the vessel by releasing gas from the pressure atmosphere through the ingredient inlet opening.

In the specific embodiment, gas input valve means is disposed to input gaseous material under pressure through a gas input opening in the pressure vessel at a location above the surface of the bath. The gas input valve means includes metering means for injection of gaseous material into the pressurized chamber at a rate effective to produce no pressure spikes within the pressure vessel.

More particularly, the gas input valve means includes container means for holding a carbon dioxide cartridge, cartridge outlet piercing means for accessing the carbon dioxide in the cartridge, valve discharge opening means for discharging carbon dioxide at a controlled rate, and coupling means for directing the carbon dioxide from the carbon dioxide cartridge into the pressure vessel.

A further feature comprises output discharge means including a float member, discharge tubing means, and discharge valve means. The float member includes a beverage inlet opening to receive fermented beverage from the bath at a location adjacent the surface of the bath. The discharge tubing means is connected at one end to direct fermented beverage from the beverage inlet opening to a beverage discharge opening located in the pressure vessel below the surface of the bath. The discharge valve means is disposed on the outside of the pressure vessel to draw fermented beverage from the bath.

A further feature of the discharge tubing means includes a draught tube having an inside diameter effective to produce a drawing pressure inside the tubing at a level below the atmospheric pressure within the pressure vessel. The pressure relief valve means is effective to maintain the selected atmospheric pressure above the surface of the bath within the pressure vessel. The draught tube is effective to produce a drawing pressure of about 2 p.s.i. at the discharge valve means.

A feature of the invention is directed to an assembly comprising pressure vessel having separable housing sections, a spigot mounted in one portion of said pressure vessel, a seal between said separable housing sections of said pressure vessel, a pressure relief valve mounted to said pressure vessel, and an inert gas producer to provide pressure within said pressure vessel and for maintaining pressure when the fermentation process is complete in the bath The output discharge means includes the spigot, a float, and tubing means for removing fermented beverage from adjacent the surface of the bath and to draw the beverage from the pressure vessel while a pressurized atmosphere remains in the vessel. The pressure relief valve is effective to release gas from the pressurized atmosphere naturally resulting from the fermentation process. The pressure vessel includes ingredient inlet means for introducing the fermentable liquid mixture into the chamber and adding a cold fermenting yeast to the bath of the fermentable liquid mixture. The upper housing section includes an ingredient inlet opening above the surface of the bath and ingredient inlet cap means to cover the inlet opening after the fermentation ingredients are introduced into the chamber. The method of the invention comprises producing an effervescent beer including the steps of combining a known premixed malt extract with water, adding a cold fermenting yeast to said mixture of premixed malt extract and water, applying a temperature relatively lower than ambient temperature to said mixture of premixed malt extract, water and cold fermenting yeast and allowing said mixture to ferment. The mixture of malt extract, water and cold fermenting yeast contained within the closed chamber is cooled to a temperature that exists in a usual home refrigerator. The float of the output discharge means includes a beverage inlet opening or entrance port in said float for allowing entry of liquid under pressure. A tube extends from said entrance port to the spigot for transporting fermented beverage from the beverage inlet opening of the float to a beverage discharge opening in the pressure vessel at a location below the surface of the bath. The spigot is disposed on the outside of the vessel to draw fermented beverage from the bath.

A pressure dispenser constitutes gas input valve means for introducing pressurized gaseous material into the pressure vessel to maintain pressure in the bath within the chamber when the fermentation process is complete. The gas dispenser is disposed to input gaseous material under pressure through a gas input opening in the pressure vessel at a location above the surface of the bath. The gas dispenser includes metering means for injecting gaseous material into the pressurized vessel chamber at a rate effective to produce no pressure spikes within the pressure vessel.

In a specific embodiment, the pressure dispenser comprises a container means or housing operable to hold a pressurized gas dispenser. A cap is operable to be connected to the housing which includes a first chamber operable to hold pressure at a first pressure and a second chamber downstream of said first chamber operable to hold pressure at a second pressure, which is lower than said first pressure. A piston is effective to allow communication between said first and second chambers with the second chamber being in communication with the pressure vessel.

Also according to the invention, there is provided apparatus for producing a fermented beverage, comprising a pressure vessel having an interior for receiving fermented-beverage-making ingredients therein, an inlet for introducing said ingredients into the vessel and an outlet for dispensing a resultant fermented beverage from the vessel; pressure relief valve means on said vessel and in communication with the interior of the vessel for relieving pressure resulting from pressure buildup in the interior of the vessel during a fermentation process occurring in the vessel; and defoaming means which is located between said relief valve means and the interior of the vessel to counteract foam produced during said fermentation process from coming into contact with the pressure relief valve means.

Further according to the invention, there is provided apparatus for producing a fermented beverage, comprising a pressure vessel having an inlet for introducing fermented-beverage-making ingredients into the vessel and an outlet for dispensing a resultant fermented beverage from said vessel; pressure relief valve means located on the outside of said vessel and being in communication with the inside of the vessel for relieving pressure resulting from pressure buildup in the vessel during a fermentation process occurring in the vessel, the pressure relief valve means comprising a valve seat on a support member and a spring loaded valve member on said seat which valve member is adapted to open when the pressure in the vessel exceeds a first predetermined value, the seat being capable of movement relative to said support member to vent the vessel to the atmosphere when the pressure in the vessel exceeds a second predetermined value, which is higher than said first predetermined value.

Also according to the invention, there is provided a method of producing a fermented beverage comprising the steps of fermenting beverage producing ingredients in the presence of a yeast and a defoaming agent, which defoaming agent is screened from the fermented beverage produced by the fermentation process.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

DETAILED DESCRIPTION

Figure 1A:
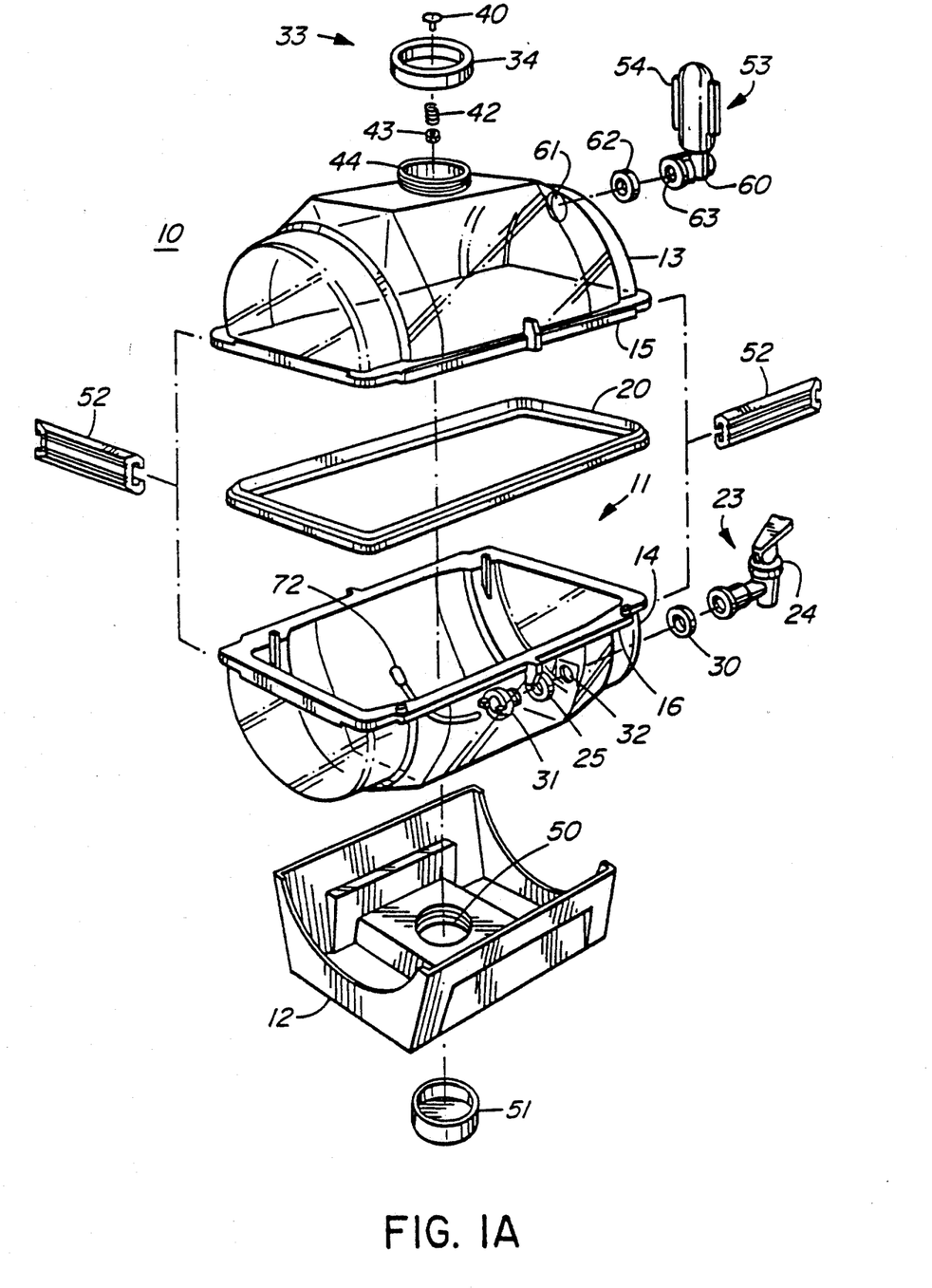
FIG. 1A is an exploded perspective view of the beer-making apparatus according to the invention.
Figure 2:
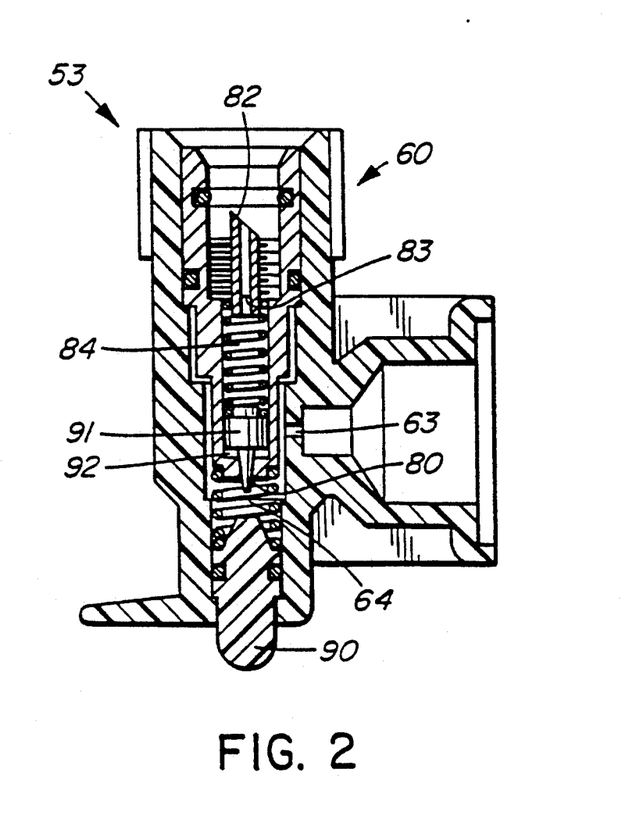
FIG. 2 is a sectional view of the carbon dioxide pressure valve of the beer-making apparatus of FIG. 1.

The beer-producing apparatus, generally designated 10 in FIGS. 1 and 2, comprises a pressure vessel, generally designated 11, and a base member 12. Pressure vessel 11 comprises two identical and separable housing sections 13, 14. Upper housing section 13 and lower housing section 14 are made from a plastic material that does not have an affinity for esters present in beer and has a low oxygen permeation rate. In this specific embodiment, housing sections 13 and 14 are composed of a transparent acrylic plastic material. More specifically, the plastic material is polyethylene terephthalate (PET). Thus, the bath within the closed chamber may be monitored during the fermentation process.

Some plastic materials have an affinity for the esters present in beer and which can, therefore, damage the flavor of the beer being made. The plastic material used in housing sections 13 and 14 should have a low oxygen permeation rate to insure that the beer being made and carried in vessel 11 has a low flavor degradation. In other words, the housing sections 13, 14 are composed of a plastic material effective to preclude damage to the flavor of the fermented beverage.

Figure 1B:
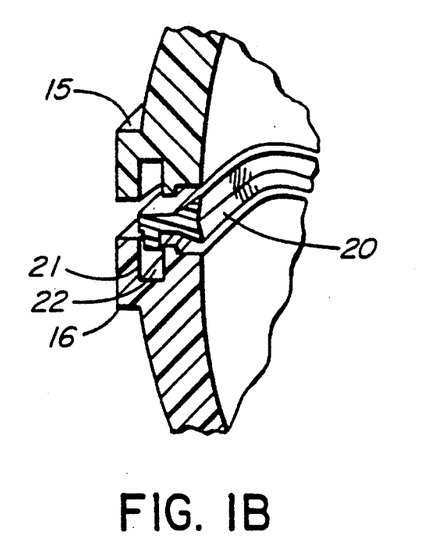
FIG. 1B is an enlarged fragmentary perspective view of the seal in relationship to upper and lower housing sections of the beer-making apparatus of FIG. 1.

A main seal 20 made of Monsanto SANTOPRENE or neoprene molded rubber is mounted between mating surfaces of the upper and lower housing sections 13, 14 as shown. As also seen in the enlarged area of FIG. 1B, the main seal 20 extends completed around the periphery and between the upper and lower housing sections 13, 14. A protuberance, or rib section 21 on the lower mating said of the seal 20 fits into the continuous recess 22 and allows the seal 20 to be retained in a complementary recess 22 extending about the periphery of the lower housing section 14 in the assembled pressure vessel 11. Thus, as is evident herein, seal 20 has a single continuous cross-section and an annular configuration shaped to fit between the mating surfaces of housing sections 13, 14.

Rails 15, 16 extend completely around the periphery of the upper and lower housing sections 13, 14, respectively.

A spigot, generally designated 23, is carried by the lower housing section 14. The spigot 23 comprises the dispenser 24, a first rubber washer 30 mounted between the outside of the lower housing section 14 and the spigot 23, a second rubber washer mounted between the inside of the lower housing section 14 and a spigot retainer nut 31 which threadingly engages spigot 23 through the lower housing section 14. A tube 72 extends from the spigot 23 as described in greater detail below.

The dispenser 24 of the spigot 23 is inserted through a hole 32 positioned in the lower housing section 14 with the first washer 30 mounted outside the pressure vessel 11 and the second washer between the spigot retainer nut 31 and the inside of the lower housing section 14. The spigot retainer nut 31 remains in position in the lower housing section 14.

A top cap assembly, generally designated 33, comprises a top cap 34, a pressure safety release valve 40, a spring 42 adapted to provide the necessary predetermined tension to the pressure release valve 40 and a nut 43 adapted to retain the spring 42 on the pressure release valve 40. The top cap 34 is adapted to screw on to complementary threaded connection 44 on the upper housing section 13.

Lower housing section 14 has a connection (not shown) identical to the connection 44 on the upper housing section 13. It extends through a hole 50 in base 12 and is closed and retained in the base 12 by a bottom cap 51. In an alternative embodiment shown in FIG. 4A and which will be referred to in more detail later, the base 12 simply snaps on to the lower housing section 14 instead of being retained by means of the bottom cap 51.

Six plastic bar clamps 52 (only two of which are illustrated) are used as closure members between the upper and lower housing sections 13, 14. The bars 52 are positioned on all four sides of the pressure vessel 11, two on each longitudinal side and one on each end. They are adapted to slide over the rails 15, 16 in a tight fit such that seal 20 is compressed between the upper and lower housing sections 13, 14 and such that the upper and lower case halves 13, 14 are held tightly together in a leak proof relationship.

A carbon dioxide dispenser generally designated 53 comprises an upper removable cartridge housing or cage 54 adapted to hold a carbon dioxide cartridge (not shown) and a lower valve stem housing 60. The carbon dioxide dispenser 53 is removably connected to the upper housing section 13 through hole 61 with retaining cap 61a.

Referring to FIG. 2, the lower valve stem housing 60 is shown in more detail. It is provided with a metering orifice 63 extending into the pressure vessel 11 and a compression chamber 64 which feeds gas emitted from the carbon dioxide cartridge to the metering orifice 63 by the action of tapered pin 80 moving out of contact with its seat by valve stem 90. Metering orifice 63 is intended to allow only such quantity of carbon dioxide to pass as can easily be handled by the pressure safety relief valve 40 on the top cap assembly 33. The pressure used within the pressure vessel 11 has been satisfactory when it is of a value of 10–12 p.s.i.

Figure 3A:
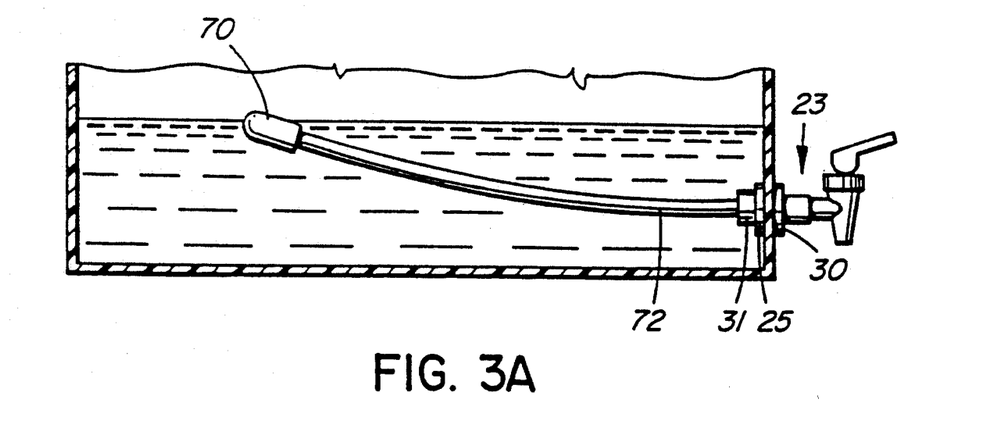
FIG. 3A is a diagrammatic illustration of the float in the liquid in the bottom portion of the container according to a further aspect of the invention.
Figure 3B:
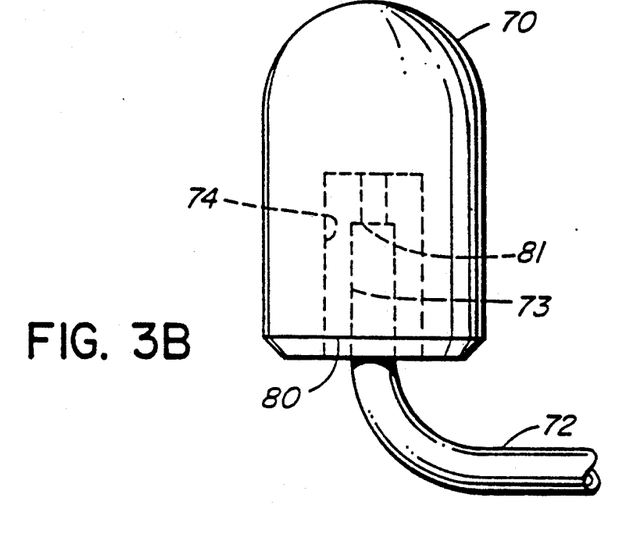
FIG. 3B is a diagrammatic and enlarged view of the float of FIG. 3A.
Figure 3C:
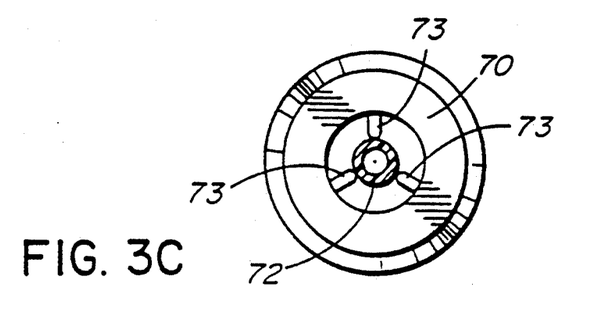
FIG. 3C is an end view of the float of FIG. 3B.

A float 70 is diagrammatically shown in FIGS. 3A, 3B ad 3C as floating on or near the surface of the liquid bath 71 held in the pressure vessel 11. The float 70 is made from polypropylene material and has a specific gravity of approximately .996 or slightly less than one so that it floats slightly below the surface of the liquid bath 71. The tube 72, already referred to above, extends from the float 70 to the spigot 23 where it is inserted within the spigot retaining nut 31. The float 70 has three ribs 73 (FIG. 3B) located equidistantly around and within the first diameter 74 of the float 70. They extend from the entrance port 75 to the end of the recess formed by the first diameter 74 and form a retaining ridge 76 which, when the tube 72 is inserted, prevents the tube 72 from contacting the end of the recess to allow the end of the tube 72 to be open to receive the beer from adjacent the surface of liquid bath to be drawn from the pressure vessel 11 (FIGS. 3B and 3C).

OPERATION

In operation, the top cap 34 will be removed and a predetermined amount of known malt extract of approximately 1 quart is poured into the pressure vessel 11. Thereafter, a predetermined amount of water is added to the malt extract until the desired height of mixture is observed in the upper housing section 13 just below the $CO_2$ dispenser 53 in the pressure vessel 11. A cold fermenting yeast is then added to the mixture and the mixture is left to allow the fermentation process to begin.

As the fermentation process begins and continues, the carbon dioxide emitted from the mixture during the fermenting process will create a pressure within the vessel 11. It is intended for this pressure not to exceed 12 p.s.i. since the vessel 11 has been designed with this pressure in mind for safety reasons. If the pressure exceeds 12 p.s.i., the pressure release valve 40 is adapted to open under the restraining influence of spring 42 and allow the excess pressure to bleed to atmosphere.

Various durations or fermentation as desired by the operator may be utilized. It has been found, however that a fermentation of three (3) or four (4) days at ordinary room temperature is satisfactory to substantially complete the initial phase of fermentation. Following the initial phase of fermentation, the brewing apparatus 10 is placed within a usual home refrigerator where the fermentation process will continue because of the cold fermentating yeast used although on a reduced scale. It has been found that the fermentation activity, as viewed through the transparent vessel 11, will be substantially completed in a seven day period.

Following the completion of the fermentation process, the beer is ready for consumption and, to that end, the operator will insert a carbon dioxide cartridge into the cartridge housing 54 and screw the cartridge housing 54 down onto the lower valve stem housing 60 until the membrane in the cartridge is pierced by pin 82. This will allow carbon dioxide to be emitted from the cartridge and through the orifice 83 and into a first chamber 84. The operator will subsequently press the valve stem 90 upwardly as viewed in FIG. 2 until the piston 91 is removed from the O-ring 92 which surrounds the piston 91 and seals the second compression chamber 64 from the first chamber 84.

Carbon dioxide will flow from the first chamber 84 to second chamber 64 and, thence, through orifice 63 and into the pressure vessel 11 at a rate effective to produce no pressure spikes in the pressure vessel and such that the pressure safety relief valve 40 is adequate to handle the release of any pressure over approximately 10-12 p.s.i.

The beer bath 71 in the pressure vessel 11, due to the pressure to which it is subject, flow upwardly within the recess extending from the entrance port 75 of the float 70 and into the open end of tube 72 where it will flow to the spigot 23. The use of the tube 72 having a reduced diameter allows the pressure of the beer bath 71 to be reduced as it flows through the tube 72 to the spigot 23. Whereas the atmospheric pressure within the pressure vessel 11 is approximately 10-12 p.s.i., the pressure of the beer drawn from bath 71 at the spigot 23 will be approximately 2 p.s.i.

The handle 24 of the spigot 23 will subsequently be operated to allow the effervescent beer to exit the vessel 11 to the user under the influence of the pressure in the pressure vessel 11 caused by the carbon dioxide.

Following the consumption of the brewed beer, the entire apparatus is easily disassembled. The bottom cap 51 is removed from the lower housing section 14 and the top cap assembly 33 is removed from the upper housing section 15. The base 12 is removed from the lower housing section 14. The plastic slide bars 52 are slidably removed from the rails 15, 16 and the seal 20 is removed from the recess 22 in the lower case half 14. The spigot 23, the carbon dioxide dispenser 53 and float 70 are likewise removed and easily disassembled. The beer making apparatus 10 can then be easily cleaned and reassembled for its next use.

Preferably, the pressure vessel 11 is made from PET, although other materials could, of course, be used. Although carbon dioxide has been found to be suitable for use in dispensing the beer, an inert gas such as nitrogen could also be used. Further, although a cartridge of carbon dioxide has also been indicated as suitable, an aerosol container appropriately designed could also be used.

Figure 4A:
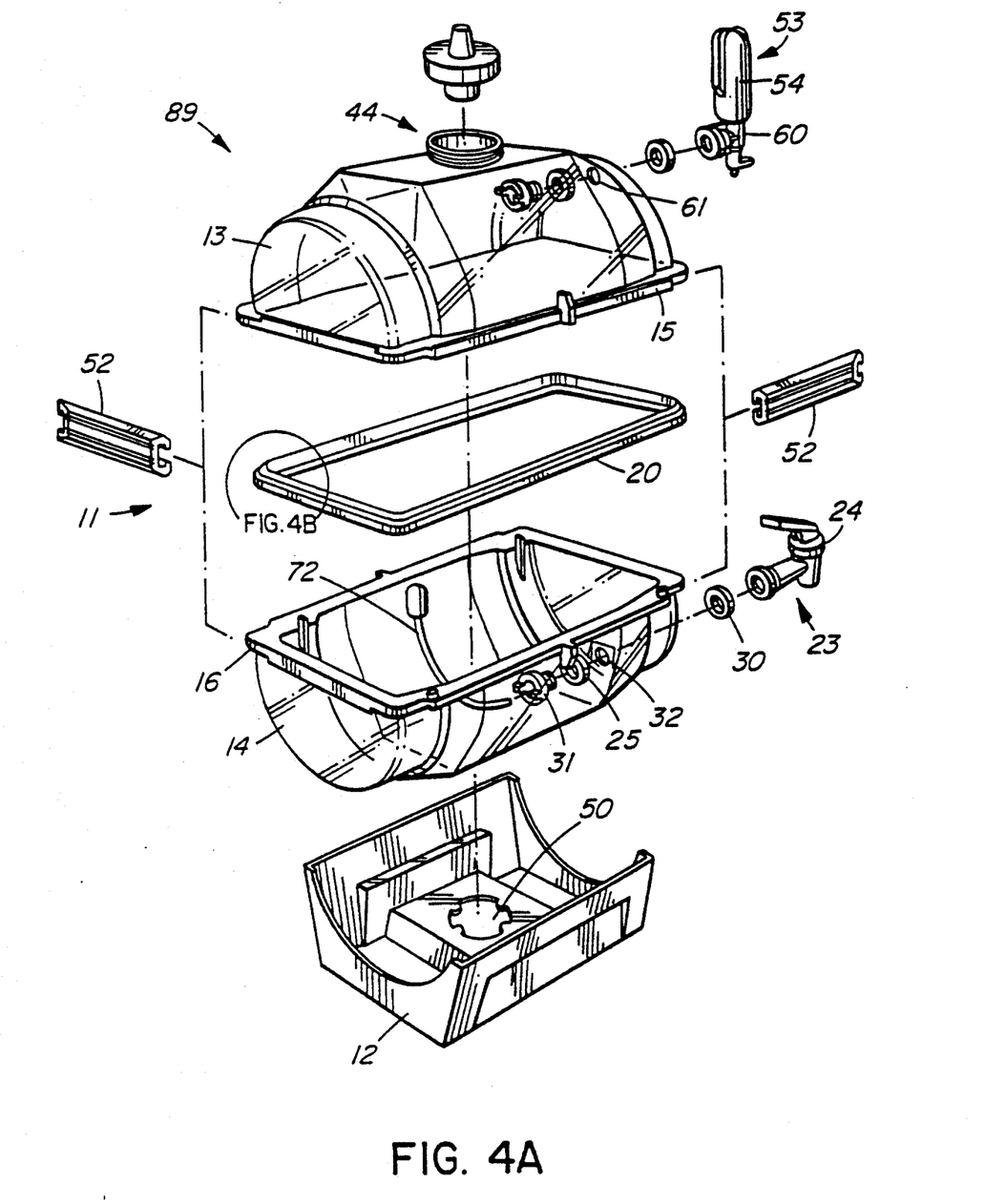
FIG. 4A is an exploded perspective view of a beer-making apparatus according to another embodiment of the invention.
Figure 4B:
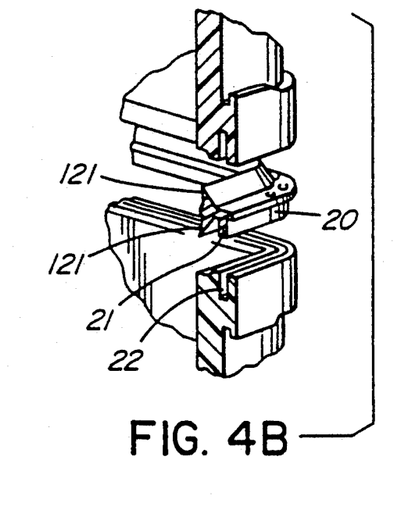
FIG. 4B is an enlarged view of a seal of the apparatus of FIG. 4A.

With reference to FIGS. 4A and 4B, a beer making apparatus, generally indicated at 89, is shown. The apparatus 89 is basically similar to the apparatus 10, but it has a modified pressure relief valve assembly. Parts of the apparatus 89, which correspond with the parts of the apparatus 10 are indicated by like reference numerals.

Figure 5A:
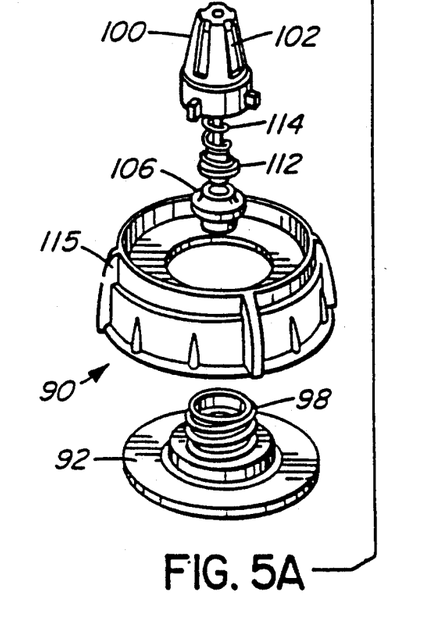
FIG. 5A is an exploded perspective view of a pressure relief valve assembly of the apparatus of FIG. 4A.
Figure 5B:
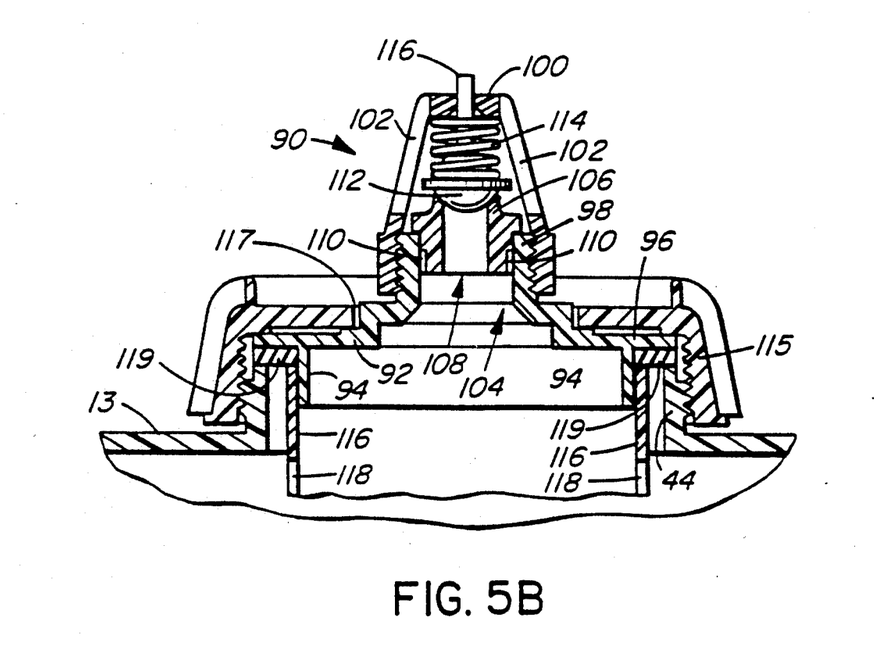
FIG. 5B is a sectional view of the pressure relief valve assembly of FIG. 5A, shown located in position on the beer-making apparatus.

With reference to FIGS. 5A, 5B and 5C, the pressure relief valve assembly of the apparatus 89 is generally shown at 90. In FIG. 5B, the assembly 90 is shown located on the threaded connection 44 of the upper housing section 13. It replaces the top cap assembly 33 shown in FIG. 1A.

The assembly 90 comprises a circular base member 92 having a cylindrical skirt 94 depending therefrom and having a flange 96 extending around the upper part of the skirt 94. The member 92 further has a central screw threaded part 98 for receiving a screw threaded cap 100 thereon. The cap 100 is provided with a plurality of circumferentially spaced slots 102 to act as air vents.

The screw threaded part 98 has a central bore 104 in which is received a bung 106 having a central bore 108. The bung 106 is, in addition, provided with a pair of diametrically opposite grooves 110 extending along the lower part thereof (FIG. 5A).

The bung 106 is of a resilient material and it has an outer diameter slightly larger than the inner diameter of the bore 104 so that it forms a press fit in the bore 104.

A pressure safety relief valve 112 is located in the cap 100 and it rests on the bung 106 which acts as a valve seat. A spring 114, adapted to provide the necessary predetermined tension to the pressure relief valve 112, is provided and the cap 100 retains the spring 114 on the valve 112.

The valve has a stem 116 which projects through an opening in the top of the cap 100 and serves as a guide for the valve 112.

It will be noted that, in contrast to the top cap assembly 33 shown in FIG. 1A, where the spring loaded part of valve 40 and spring 42 are located inside the pressure vessel 11, the valve 112 and the spring 114 are on the outside of the pressure vessel 11 and thus less likely to be exposed to the contents of the vessel 11. Thus, failure of the pressure relief valve 112 due to contact with contamination by the contents of the vessel 11, such as foam and sediment formed during the fermentation process, is counteracted. As a further precaution, the press fit of the bung 106 in the bore 104 is such that the bung 106 will be forced upwards should the pressure exceed a predetermined value which is higher than the normal operating pressure of the pressure relief valve 112. Thus, the bung 106 will be forced upwards to expose the grooves 110 to the outside of the vessel 11 or even, in extreme cases, to force the bung 106 out of the bore 104, thereby to relieve the pressure inside the vessel 11 should the pressure relief valve 112 fail, for example, due to clogging of the bore 108.

As a further safety measure the upper and lower housing sections 13, 14 of the vessel 11 are designed so that they will separate at the four corners of the housing sections 13, 14 to release pressure in the unlikely event of the pressure relief valve assembly 90 failing altogether. Thus, as the pressure inside the vessel 11 increases, the mutually facing surfaces between which the seal 20A is sandwiched will tend to separate to allow pressure to escape at the corners. This is facilitated by the seal 20A having upper lips 121, as shown in FIG. 4B, which can be forced open as the surfaces at the corners are separated during pressure increase to open up the seal 20. The vessel 11 has been designed for this to occur at a pressure of about 30-35 p.s.i.

As is evident in the drawing, lip projections 121 outwardly extend into the pressurized chamber and have a structural configuration effective to further seal mating surfaces thereby precluding escape of gaseous material form the pressurized chamber.

The relief valve assembly 90 is held in place on the threaded connection 44 by a screw threaded cap 115 having a central opening 117 therein. A rubber seal 119 is located between the flange 96 and the top of the threaded connection 44. The seal 119 is clamped between the flange 96 and the top of the threaded connection 44, forming a passive seal.

In the earlier description, the pressure used in the pressure vessel has been referred to as being of a value of 10-12 p.s.i. However, an even higher pressure of a value of 13-15 p.s.i. has also been found to be satisfactory and is preferred when used with the apparatus 89. Also the pressure relief valve assembly 90 is adapted to relieve the pressure when the pressure exceeds a value of about 17 p.s.i. rather than 12 p.s.i. referred to earlier in connection with the pressure relief valve 40.

For the proper functioning of the pressure relief valve 112, it is desirable to prevent foam from coming into contact with the pressure relief valve assembly 90.

Foam forms during the fermentation process and the foam tends to rise to the top of the vessel 11. This foam carries with it sediment and other products of the fermentation process which are of a thick consistency and tend to clog up the pressure relief valve assembly 90.

Figure 6A:
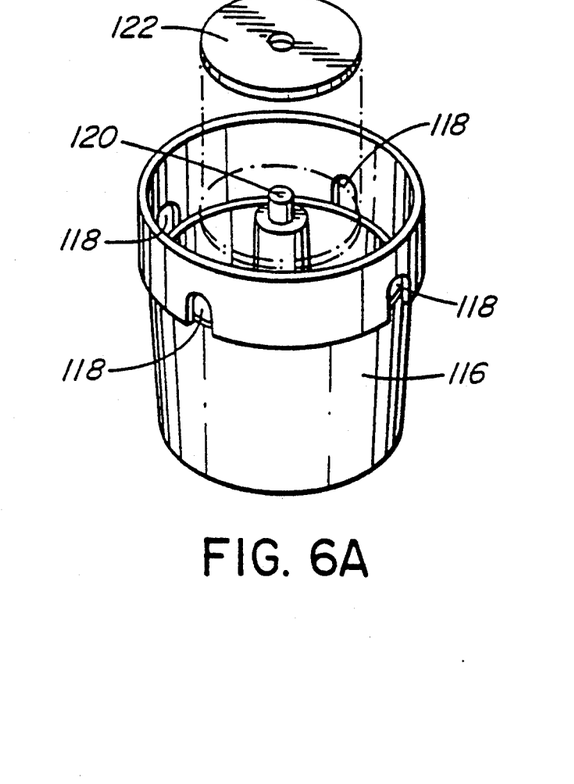
FIG. 6A is a perspective vie of a foam counteracting cup of the apparatus of FIG. 5B.
Figure 6B:
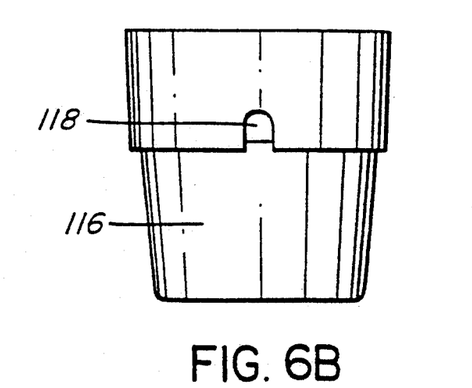
FIG. 6B is a side elevational view of the cup of FIG. 6A.

To prevent the foam from reaching the valve assembly 90, a cup 116 having a plurality of circumferentially spaced openings 118 is located under the valve assembly 90. It has an inner diameter so that it will frictionally engage around the skirt 94. The openings 118 serve to break up the foam passing therethrough, due to surface tension. Sediment carried by the broken up foam will settle in the bottom of the cup 116 and is periodically cleaned out. The cup 116 may also be used in conjunction with the top cap assembly 33 shown in FIG. 1A.

Figure 6C:
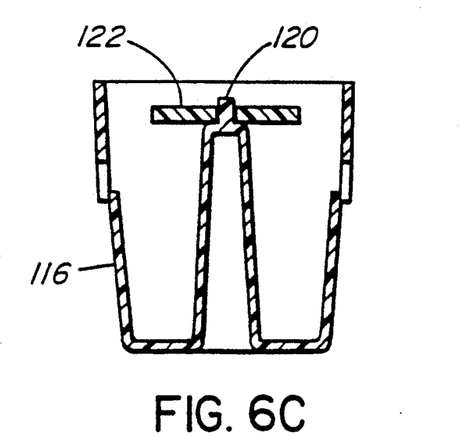
FIG. 6C is a diametrical cross-section cross-sectional view through the cup of FIG. 6A.

As can be seen from FIGS. 6A and 6C, the cup 116 has a central pin 120 on which is received a disk 122. The disc 122 is of a porous material which is impregnated with a chemical defoamer, as a precaution, to break up any foam not broken up during entry through the openings 118. It has been found that a fatty acid, preferably oleic acid, serves as an effective defoamer in this application, but other suitable fatty acids or mixtures thereof can also be used.

Figure 7A:
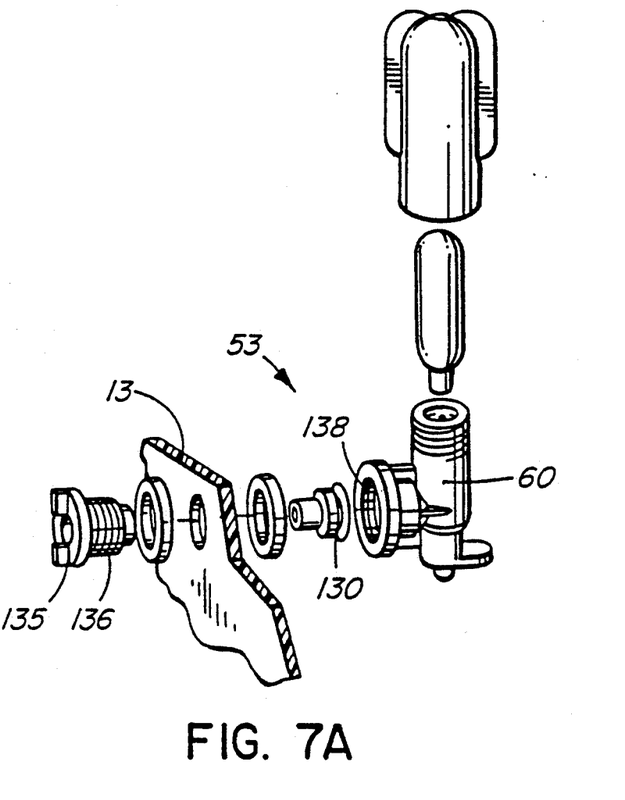
FIG. 7A is an exploded perspective view of a carbon dioxide pressure valve assembly of the apparatus of FIG. 4A.
Figure 7B:
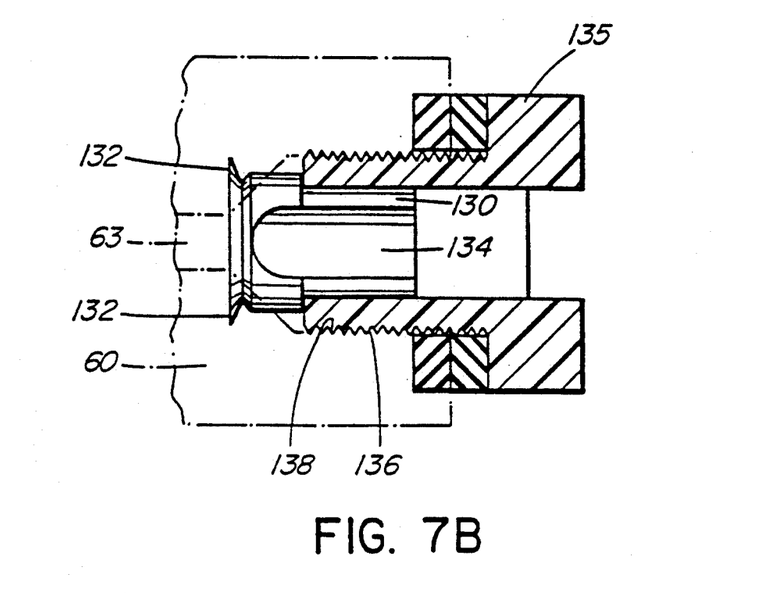
FIG. 7B is a sectional view of a backflow preventing plug for use with the carbon dioxide pressure valve assembly of FIG. 7A.
Figure 7C:
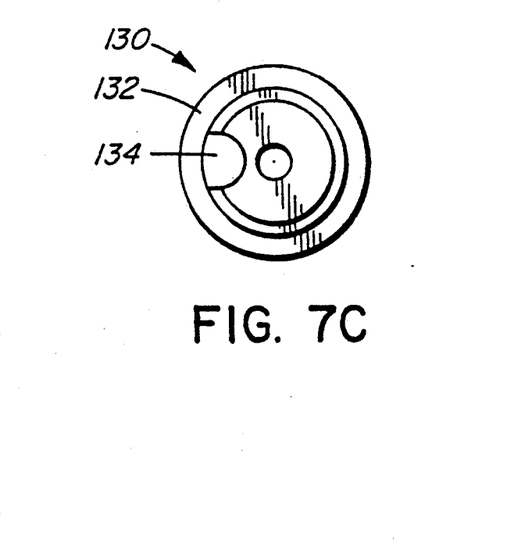
FIG. 7C is an end view of the plug of FIG. 7B.
Figure 8:
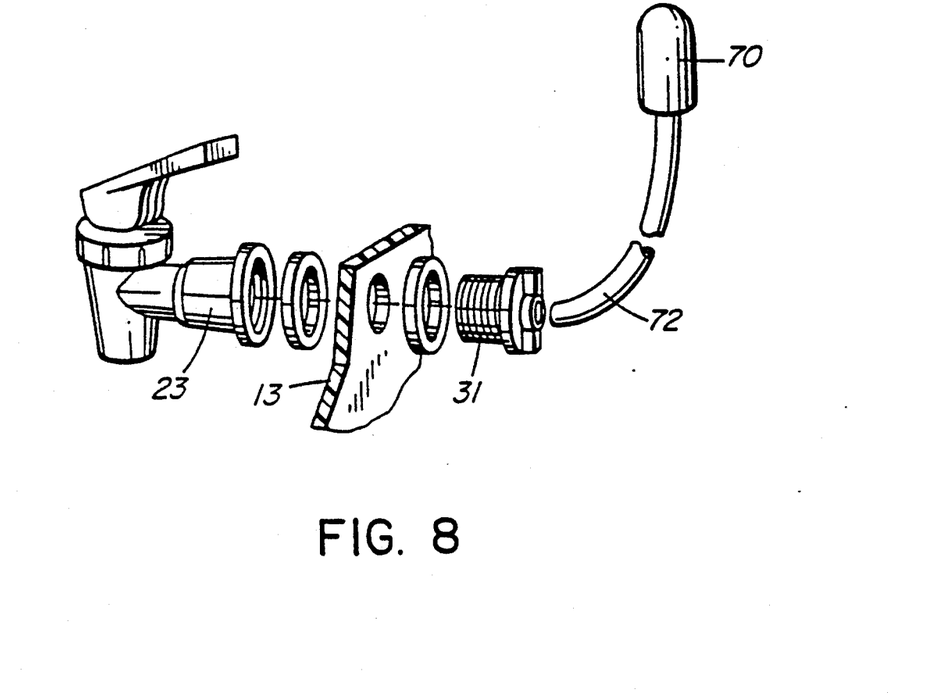
FIG. 8 is an exploded perspective view of a float and dispenser part of the apparatus of FIG. 4A.

With reference to FIGS. 7A, 7B and 7C, the carbon dioxide pressure valve 53 is shown with a backflow preventing plug 130 according to a further aspect of the invention. The plug 130 as a flange 132 at one end and a groove 134 extending along part of its length, as shown in FIG. 7B.

A retaining cap 135 is provided which has an external screw thread as shown at 136. It fits on the inside of the upper housing section 13 and screws into a mating thread 138 on the inside of the housing 60 to mount the valve 53 on the upper housing section 13. The plug 130 is located in the bore of the cap 62 so that one end of the groove 134 projects from the cap 62 to allow the passage of $CO_2$ gas from the valve 53 into the vessel 11 (FIG. 7B).

As shown in FIG. 7B, the outer diameter of the flange 132 is greater than the inside diameter of the inside tapered surface of the housing 60. Thus, the flange 132 will be folded backwards (not shown in the drawing) as it presses against the tapered inside surface of the housing 60, to effectively form a one-way valve. It will allow the passage of $CO_2$ gas from the carbon dioxide cartridge but not the passage of gas or fluid from the inside of the vessel 11. This protects the valve 53 from backflow from the vessel 11 which could interfere with its proper functioning.

As will be appreciated from the foregoing description, the pressure vessel 11 serves three purposes. Firstly, it serves as a fermentation vessel where the fermentation process takes place. Secondly, it serves as a conditioning vessel where conditioning of the beverage by the addition of $CO_2$ gas and/or the lowering of the temperature thereof. Thirdly, the vessel 11 has been designed to serve as a dispenser from which the finished product can be dispensed directly into a drinking vessel for consumption. This is facilitated by the use of the float 70 by means of which the beverage is drawn off from the surface of the liquid and not from the bottom. The vessel 11 is further of a size so as to conveniently fit into a household refrigerator for the conditioning of the beverage and to chill the beverage for consumption. During the cooling of the beverage, when conditioning takes place, it accepts $CO_2$ which results in the beer attaining a desired flavour and encourages removal of turbidity.

The final product therefore does not need to be transferred to another vessel for conditioning or for storage prior to consumption.

It is a further advantage that the cup 116 prevents the beverage in the vessel 11 from coming into contact with the chemical defoaming agent, as happens with conventional systems. Thus, the beverage being consumed is uncontaminated by the defoaming agent.

While the foregoing embodiments have been described with beer making in mind, it will be appreciated that the apparatus can be used for making other fermented beverages, alcoholic or non-alcoholic. It is also contemplated that the apparatus can be used for the production of wine or products using other fruit juice concentrates.

Many modifications will readily occur to those skilled in the art to which the invention relates and the specific embodiments described should be considered illustrative of the invention only and not as limiting its scope as construed in accordance with the accompanying claims.

What is claimed is:
1. An apparatus for producing a fermented beverage, said apparatus comprising:
  a) a pressure vessel having an interior for receiving fermented beverage-making ingredients therein, an inlet for introducing said ingredients into the vessel, and an outlet for dispensing a resultant fermented beverage from the vessel;
  b) pressure relief valve means on said vessel and in communication with the interior of the vessel for relieving pressure resulting from pressure buildup in the interior of the vessel during a fermentation process occurring in the vessel; and c) defoaming means located between said relief valve means and the interior of the vessel to counteract foam produced during said fermentation process from coming into contact with the pressure relief valve means;

d) said defoaming means including a housing between the relief valve means and the interior of the vessel to screen the relief valve means from the interior of the vessel, the housing having at least one opening therein of a predetermined size for the breakup of foam passing therethrough;

e) the housing including a cup-shaped member having a plurality of said openings spaced around its circumference.

2. The apparatus according to claim 1, wherein a chemical defoaming agent s supported on a solid carrier inside the housing.

3. The apparatus according to claim 2, wherein said chemical defoaming agent comprises a fatty acid.

4. The apparatus according to claim 3, wherein said fatty acid comprises oleic acid and the solid carrier comprises a porous material.

5. An apparatus for producing a fermented beverage said apparatus comprising:

a) a pressure vessel having an interior for receiving fermented beverage-making ingredients therein, an inlet for introducing said ingredients int the vessel, and an outlet for dispensing a resultant fermented beverage from the vessel;

b) pressure relief valve means on said vessel and in communication with the interior of the vessel for relieving pressure resulting from pressure buildup in the interior of the vessel during a fermentation process occurring in the vessel; and c) defoaming means located between said relief valve means and the interior of the vessel to counteract foam produced during said fermentation process from coming into contact with the pressure relief valve means;

d) said defoaming means including a chemical defoaming agent supported on a solid carrier.

6. The apparatus according to claim 5, wherein the defoaming agent comprises a fatty acid.

7. The apparatus according to claim 6, wherein the fatty acid is oleic acid.

8. The apparatus according to claim 6, wherein and solid carrier comprises a porous material.

9. An apparatus for producing a fermented beverage, said apparatus comprising:

a) a pressure vessel having an interior for receiving fermented beverage-making ingredients therein, an inlet for introducing said ingredients into the vessel, and an outlet for dispensing a resultant fermented beverage from the vessel;

b) pressure relief valve means on said vessel and in communication with the interior of the vessel for relieving pressure resulting from pressure buildup in the interior of the vessel during a fermentation process occurring in the vessel; and c) defoaming means located between said relief valve means and the interior of the vessel to counteract foam produced during said fermentation process from coming into contact with the pressure relief valve means;

d) a pressure dispenser including a housing operable to hold a gas dispenser, a cap operable to be connected to said housing, a first chamber in said housing operable to hold pressure at a first pressure and a second chamber downstream of said first chamber operable to hold pressure at a second pressure, said second pressure being lower than said first pressure, a piston to allow communication between said first and second chambers, said second chamber having a channel which is in communication with said pressure vessel.

10. The apparatus according to claim 9, wherein said pressure dispenser includes valve means for preventing fluid flow from said pressure vessel into said second chamber.

11. The apparatus according to claim 10, wherein said channel includes a portion which is tapered towards said second chamber, and said valve means includes a plug having a flange which engages said tapered portion and is adapted to flex to allow fluid flow form said second chamber to said vessel and to seal against said tapered portion to prevent fluid flow in the opposite direction.

12. The apparatus according to claim 10, wherein said pressure dispenser includes an inert gas cartridge operable to be mounted in said first chamber.

* * * * *